(12) United States Patent
Reul et al.

(10) Patent No.: US 11,142,047 B2
(45) Date of Patent: Oct. 12, 2021

(54) VEHICLE WINDOW HAVING A PLURALITY OF INTEGRATED ELECTRO-OPTICAL ELEMENTS AND METHOD FOR ITS MANUFACTURE

(71) Applicant: SAINT-GOBAIN GLASS FRANCE, Courbevoie (FR)

(72) Inventors: Bernhard Reul, Herzogenrath (DE); Michael Labrot, Aachen (DE); Philippe Letocart, Raeren (BE); Christian Effertz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/643,134

(22) PCT Filed: Jun. 27, 2018

(86) PCT No.: PCT/EP2018/067191
§ 371 (c)(1),
(2) Date: Feb. 28, 2020

(87) PCT Pub. No.: WO2019/042623
PCT Pub. Date: Mar. 7, 2019

(65) Prior Publication Data
US 2020/0254855 A1 Aug. 13, 2020

(30) Foreign Application Priority Data
Aug. 31, 2017 (EP) .................... 17188671

(51) Int. Cl.
*B60J 3/04* (2006.01)
*H04L 12/40* (2006.01)
*G02F 1/00* (2006.01)

(52) U.S. Cl.
CPC .............. *B60J 3/04* (2013.01); *G02F 1/0018* (2013.01); *H04L 12/40* (2013.01); *H04L 2012/40215* (2013.01); *H04L 2012/40273* (2013.01)

(58) Field of Classification Search
CPC ................... G02F 1/0018; H04L 12/40; H04L 2012/40215; H04L 2012/40273; B60J 3/04
See application file for complete search history.

(56) References Cited

U.S. PATENT DOCUMENTS 5,397,888 A * 3/1995 Muramatsu ............. G02F 1/163
250/205
6,373,618 B1 4/2002 Agrawal et al.
(Continued)

FOREIGN PATENT DOCUMENTS

JP H05-147983 A 6/1993
JP 2004-093873 A 3/2004
(Continued)

OTHER PUBLICATIONS

International Search Report as issued in International Patent Application No. PCT/EP2018/067191, dated Jul. 25, 2018.

*Primary Examiner* — Henry Tsai
*Assistant Examiner* — John B Roche
(74) *Attorney, Agent, or Firm* — Pillsbury Winthrop Shaw Pittman LLP (57) ABSTRACT

A vehicle window has a plurality of integrated electro-optical elements, wherein the electro-optical elements have a common supply voltage, wherein the integrated electro-optical elements are controllable individually or in groups such that the electro-optical elements change the optical properties of the window at the respective location, wherein a first logical interface for feeding in the common supply voltage and a second logical interface for feeding in a
(Continued)

common control signal are provided for controlling the electro-optical elements and for providing the common supply voltage, wherein, downstream from the logical interface, the control signal is converted into control signals for the control of the integrated electro-optical elements individually or in groups, wherein the physical interface is arranged on one of the outer faces of the window, wherein the physical interface for the first logical interface and the second logical interface has, together, 3 or 4 electrical connections.

12 Claims, 5 Drawing Sheets

(56) References Cited

U.S. PATENT DOCUMENTS

| | | | | |
|---|---|---|---|---|
| 2010/0321758 | A1* | 12/2010 | Bugno | G02F 1/163 |
| | | | | 359/267 |
| 2016/0261127 | A1* | 9/2016 | Worry | H01M 10/425 |
| 2019/0139724 | A1* | 5/2019 | Detlefsen | H01H 23/12 |

FOREIGN PATENT DOCUMENTS

| | | |
|---|---|---|
| JP | 2004-138795 A | 5/2004 |
| JP | 2004-175342 A | 6/2004 |
| WO | WO 2009/158510 A2 | 12/2009 |
| WO | WO 2016/063277 A2 | 4/2016 |
| WO | WO 2016/116120 A | 7/2016 |

* cited by examiner

VEHICLE WINDOW HAVING A PLURALITY OF INTEGRATED ELECTRO-OPTICAL ELEMENTS AND METHOD FOR ITS MANUFACTURE

CROSS-REFERENCE TO RELATED APPLICATIONS

This application is the U.S. National Stage of PCT/EP2018/067191, filed Jun. 27, 2018, which in turn claims priority to European patent application number 17 188 671.6 filed Aug. 31, 2017. The content of these applications are incorporated herein by reference in their entireties.

The invention relates to a vehicle window having a plurality of integrated electro-optical elements and a method for its manufacture.

It is known that windows can be equipped with controllable optical elements.

Different technologies are available for the controllable optical elements. Optically controllable elements can change their transmittance properties under the influence of an applied voltage.

Thus, it is, for example, possible to switch from a transparent state to a "milk glass state" or to a "darkened" state. Depending on the technology used, gradual switching or binary switching can be enabled.

Such elements are, for example, used in automotive sector but also in the building glass sector as solar protection and/or privacy protection.

From the international patent application WO 2016/063 277 A2, it is known to produce PDLC (polymer dispersed liquid crystals) displays.

Further known from the international patent application WO 2016/063 277 A2 is parallel control of segments of the display that are connected to a power supply. In other words, in addition to the power supply for each of the segments, at least one switching line is also needed per segment.

A similar system for building glass is also known from U.S. Pat. No. 5,397,888. There, one segment of an electrochromic display is in each case controlled by respective control lines.

However, it has been demonstrated that the above solution is disadvantageous in many sectors since the connection of the individual segments occupies a great deal of space. The space requirement also results in the fact that the connections are often damaged during assembly due to high mechanical stress. Furthermore, the large number of control lines necessary in some areas constitutes problematic interference with the transmittance properties.

Against this background, an object of the invention is to make available a window that offers a reliable connection with, at the same time, improved optical properties.

The object is accomplished by a vehicle window having a plurality of integrated electro-optical elements, wherein the electro-optical elements have a common supply voltage, wherein the integrated electro-optical elements can be controlled individually or in groups such that the electro-optical elements change the optical properties of the window at the respective location, wherein a first logical interface for feeding in the common supply voltage and a second logical interface for feeding in a common control signal are provided for controlling the electro-optical elements and for providing the common supply voltage, wherein, downstream from the logical interface, the control signal is converted into control signals for the control of the integrated electro-optical elements individually or in groups, wherein the physical interface is arranged on one of the outer faces of the window, wherein the physical interface for the first logical interface and the second logical interface has, together, 3 or 4 electrical connections.

By means of the present invention, it is possible to control individual segments while keeping the space requirement for the power supply and the control small. In addition, the arrangement permits simple and reliable wiring and thus ensures a long service life. Furthermore, the individual electro-optical elements can be selectively controlled extremely effectively by means of a small number of lines.

In one embodiment of the invention, the electro-optical elements are provided for controlling the optical transparency of the window.

In other words, the transparency can be adapted to the surroundings or as desired in suitable stages.

According to another embodiment of the invention, the electro-optical elements are selected from a group comprising: electrochromic coating, suspended particle device, liquid crystal, polymer dispersed liquid crystal device.

Thus, the invention can be used with different types of electro-optical elements for different purposes.

According to yet another embodiment of the invention, the physical interface is arranged on a recess of the window.

The space requirement can be reduced by this embodiment.

In another embodiment of the invention, the second logical interface is a single-wire or a two-wire interface.

In other words, the individual electro-optical elements can be selectively controlled extremely effectively by means of a small number of lines.

In yet another embodiment of the invention, the second logical interface can be connected to a bus system.

In other words, the electro-optical elements in the window according to the invention can be integrated into a controller.

According to another embodiment of the invention, the second logical interface further electrically connects sensor and/or display elements in the window.

Thus, for example, control of the electro-optical elements in the window according to the invention and other devices can be enabled, while minimizing the number of lines.

In another embodiment of the invention, the physical interface is arranged at the edge of the window.

Thus, for example, the connection can even be relocated in a frame region such that the transparency of the window is retained over a large area.

In yet another embodiment of the invention, the first logical interface provides an AC voltage.

Thus, even electro-optical elements of certain technologies that require an AC voltage can be controlled.

According to yet another embodiment of the invention, the first logical interface provides a DC voltage.

With this, even electro-optical elements of certain technologies, such as electrochromic coating, which require a DC voltage, can be controlled.

By means of the invention presented, it is possible to provide a window in which the individual segments can be controlled, wherein the space requirement for the power supply and also the control can be kept small. In addition, the arrangement allows simple and reliable wiring and thus ensures a long service life.

The windows according to the invention can be used both in vehicles and in buildings.

Embodiments of the present invention are described by way of example with reference to the appended drawings, which depict.

DETAILED DESCRIPTION OF THE INVENTION WITH REFERENCE TO THE DRAWINGS

In the following, the invention is presented in greater detail with reference to the figures. It should be noted that different aspects are described that can, in each case, be used individually or in combination. In other words, any aspect can be used with different embodiments of the invention unless explicitly presented as a pure alternative.

Furthermore, for the sake of simplicity, usually only one entity is referenced in the following. Unless explicitly stated, the invention can also include, however, in each case, a plurality of the entities concerned. Thus, the use of the words "a" and "an" is to be understood only as an indication that at least one entity is used in a simple embodiment.

When methods are described in the following, the individual steps of a method can be arranged and/or combined in any order unless the context explicitly indicates something different. Furthermore, the methods can be combined with one another—unless explicitly indicated otherwise.

Data with numerical values are usually not to be understood as exact values but also include a tolerance of +/−1% to +/−10%.

Reference to standards or specifications or norms shall be understood as reference to standards or specifications or norms that apply/applied at the time of the application and/or—if a priority is claimed—at the time of the priority application. However, this implies no general exclusion of applicability for subsequent or superseding standards or specifications or norms.

In the following, reference will be made to logical and physical interfaces. It should be noted in this regard that one physical interface can provide more than one logical interface. Thus, for example, a higher-frequency signal can be present on a DC voltage or a lower frequency AC voltage. This combined signal can be made available via a physical interface. However, this signal can then correspond to two logical interfaces, with one interface used for the higher frequency signal and the other interface for the DC voltage or a lower frequency AC voltage.

A vehicle window 1 according to the invention has a plurality of integrated electro-optical elements $10_1, 10_2, 10_3, \ldots 10_N$. The electro-optical elements $10_1, 10_2, 10_3, \ldots 10_N$ have a common supply voltage.

Although the invention will be described in the following with reference to vehicle windows, it can also be used for building windows. In this regard, the following description is exemplary.

The supply voltage is made available, for example, via a logical interface 20.

In the embodiment according to the invention, the integrated electro-optical elements $10_1, 10_2, 10_3, \ldots 10_N$ can be controlled individually or in groups by a controller 30; $30_1, 30_2, 30_3 \ldots 30_N$ such that the electro-optical elements change the optical properties of the window 1 at the respective location, wherein a first logical interface 20 for feeding in the common supply voltage and a second logical interface 21 for feeding in a common control signal are provided for controlling the electro-optical elements $10_1, 10_2, 10_3, \ldots 10_N$ and providing the common supply voltage, wherein, downstream from the logical interface, the control signal is converted into control signals for the control of the integrated electro-optical elements $10_1, 10_2, 10_3, \ldots 10_N$ individually or in groups, wherein the physical interface 40 is arranged on one of the outer faces 100, 400 of the window 1.

Figure 1:
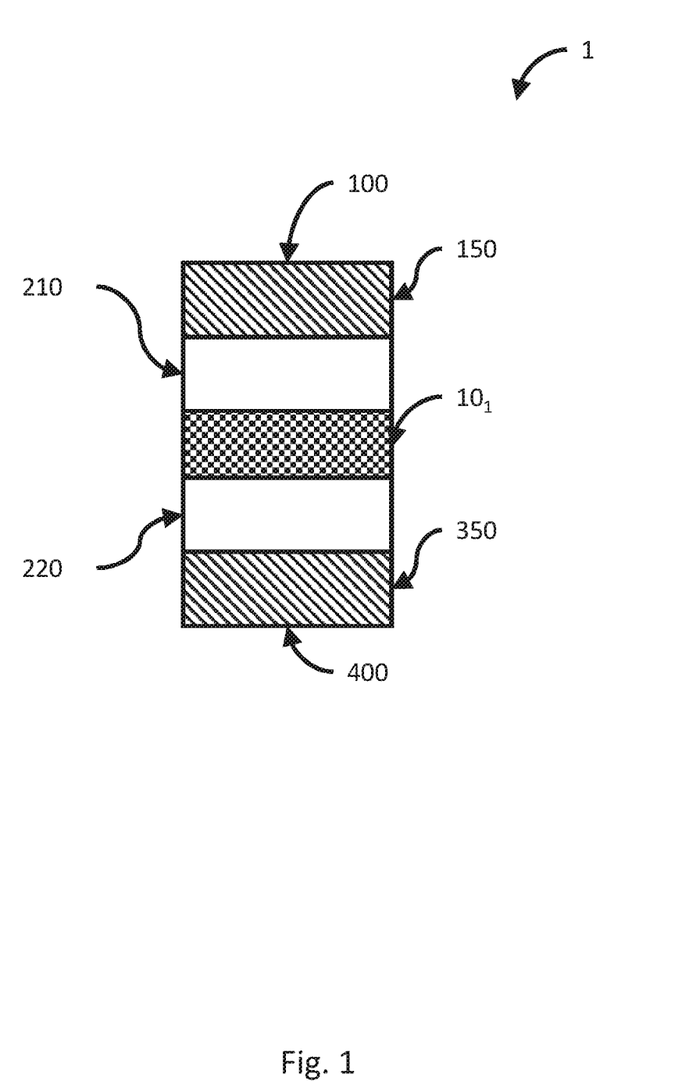
FIG. 1 a schematic sectional representation of the layers of a window.
Figure 2:
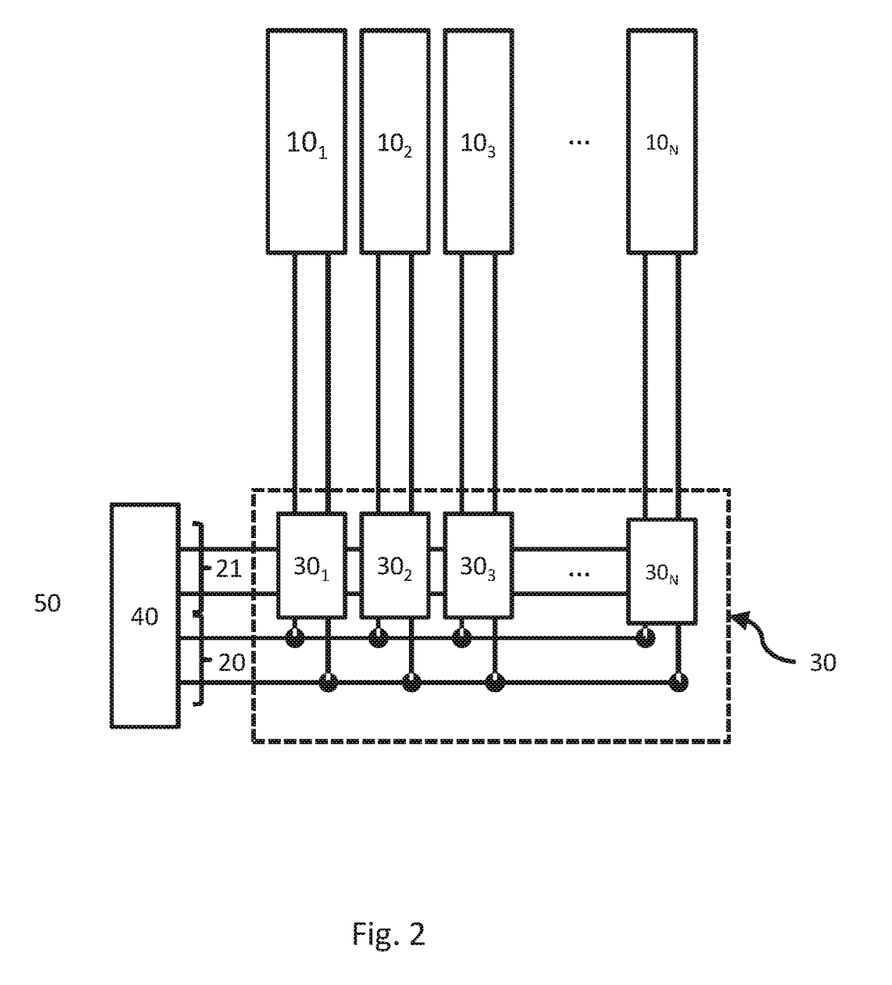
FIG. 2 a schematic representation of logical elements in accordance with an embodiment of the invention, FIG. 3 another schematic representation of logical elements in accordance with another embodiment of the invention, FIG. 4 a schematic sectional representation of layers of the window with further aspects of the invention, and FIG. 5 a schematic flow chart of a production method according to the invention.

FIG. 2 shows the case in which the integrated electro-optical elements $10_1, 10_2, 10_3, \ldots 10_N$ are controlled individually by a controller $30_1, 30_2, 30_3 \ldots 30_N$. Here, for example, the signals corresponding to a logical division of the interfaces 20 and 21 are routed as a common power supply (lower connections) to logical control units $30_1, 30_2, 30_3 \ldots 30_N$, which, in turn, receive control signals via an interface 21 (upper connections) and evaluate them. If the respective control unit $30_1, 30_2, 30_3 \ldots 30_N$ detects that the electro-optical element $10_1, 10_2, 10_3, \ldots 10_N$ associated therewith is to be switched, the connection to the power supply is established. In other words, the control occurs in spatial proximity.

Figure 3:
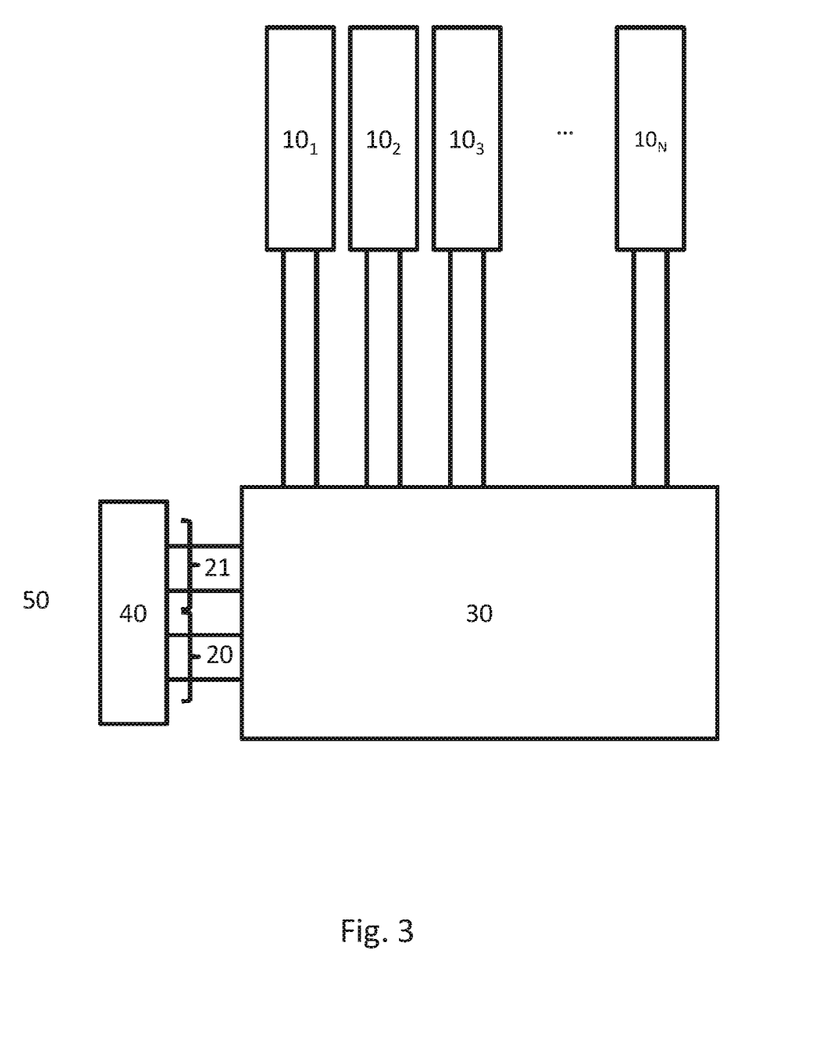

In contrast, FIG. 3 shows the case in which the integrated electro-optical elements $10_1, 10_2, 10_3, \ldots 10_N$ are controlled in groups by a controller 30. Here, for example, the signals are routed to a control unit 30 in accordance with a logical division of the interfaces 20 and 21 as a common power supply (lower connections), which, in turn, receives control signals via an interface 21 (upper connections) and evaluates them. If the control unit 30 detects that one or more of the electro-optical elements $10_1, 10_2, 10_3, \ldots 10_N$ associated therewith are to be switched, the connection to the power supply is established. In other words, the control occurs centralized in spatial proximity.

Of course, mixed forms can also be provided.

The controller can, for example, be configured such that each of the electro-optical elements $10_1, 10_2, 10_3, \ldots 10_N$ is addressed individually, but, for example, the transparency for all electro-optical elements $10_1, 10_2, 10_3, \ldots 10_N$ controlled is controlled in common via a common controller of the voltage on the logical interface. This variant can be used particularly easily in embodiments according to FIG. 2.

Furthermore, the controller can also be configured such that, for example, the electro-optical elements $10_1, 10_2, 10_3, \ldots 10_N$ are linked such that, for example, the control of an electro-optical element $10_M$ (with $1<=M<=N$) always also includes the electro-optical elements $10_1, 10_2, 10_3, \ldots 10_M$. This variant can be used particularly easily in embodiments according to FIG. 3.

It should be noted that the different variants have in each case their own advantages. Thus, a division into individual sub-controllers allows, for example, better distribution of thermal sources. On the other hand, a central controller can be more space-saving. Thus, different objectives can be emphasized more strongly.

Figure 4:
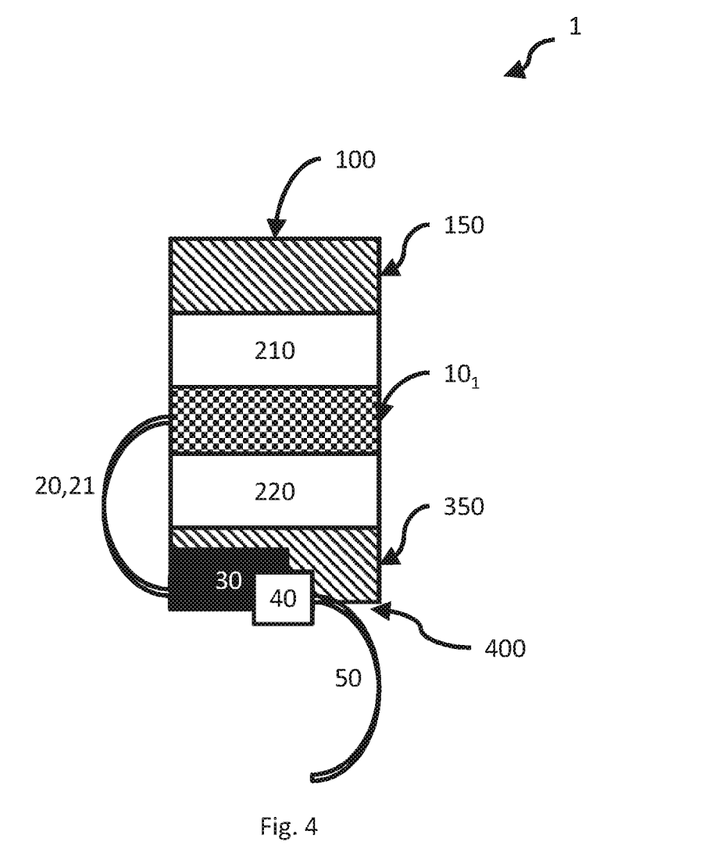

Common to all solutions is the fact that the controller 30; $30_1, 30_2, 30_3 \ldots 30_N$ can, with suitable dimensioning, be arranged either on one of the outer faces of the window 1, as depicted in FIG. 4, or in an intermediate layer. Furthermore, of course, parts of the controller 30; $30_1, 30_2, 30_3 \ldots 30_N$ can also be arranged on one of the outer faces of the window 1, while other parts of the controller 30; $30_1, 30_2, 30_3 \ldots 30_N$ can be arranged in an intermediate layer. According to the invention, the physical interface 40 has three or four electrical connections away from the vehicle window (1).

By means of the invention presented, it is possible to control individual segments while being able to keep the space requirement for the power supply and the control small. In addition, the arrangement permits simple and reliable wiring and thus ensures a long service life. In other words, by means of a small number of lines, the individual electro-optical elements $10_1, 10_2, 10_3, \ldots 10_N$ can be selectively controlled extremely effectively.

In one embodiment of the window according to the invention 1, the electro-optical elements $10_1, 10_2, 10_3, \ldots 10_N$ are provided for controlling the optical transparency of the window 1.

In other words, the optical transparency can be adapted to the surroundings or as desired in suitable stages. Both two stages (transparent/non-transparent) and multiple (intermediate) stages as well as, in the case of certain electro-optical layers, infinite adaptation can be enabled. Both a common control of transparency for selected electro-optical elements and transparency adjustable for each element can be provided.

In one embodiment of the invention, the electro-optical elements $10_1, 10_2, 10_3, \ldots 10_N$ are selected from a group comprising: electrochromic coating, suspended particle device, liquid crystal, polymer dispersed liquid crystal device.

Thus, the invention can be used with different types of electro-optical elements for different purposes. For example, electrochromic coating, suspended particle device, liquid crystal makes available a change from a dark to a transparent state, whereas, for example, a polymer dispersed liquid crystal device can make available a change from a transparent to a milk glass state.

In another embodiment of the invention, the physical interface 40 is arranged, as shown in FIG. 4, on a recess of the window 1 on the outer side 400. The recess can be from less than 1 mm all the way to 2 mm and is limited only by the stability requirements of the glass layer and of the window 1.

By means of this embodiment, the space requirement can be minimized and additional stability for the physical interface 40 can be provided.

In yet another embodiment of the invention, the second logical interface 21 is a single-wire or two-wire interface.

By means of single-wire or two-wire interfaces, the logical interface 21 can be designed in a physically space-saving manner. A so-called "single-wire interface" combines both the supply voltage and the data line and makes available a combination of a first logical interface 20 and a second logical interface 21 on at least two physical conductors.

In one embodiment of the invention, the second logical interface 21 can be connected to a bus system, for example, via a cable 50. For example, with it, a connection to a vehicle bus system, such as a CAN bus, or to an electronic installation bus system, such as the European installation bus (EIB), can be provided. In other words, the electro-optical elements in the window according to the invention can be integrated into a controller.

According to another embodiment of the invention, the second logical interface 21 further electrically connects sensor and/or display elements in the window 1. For example, one or a plurality of (capacitive) sensors (proximity switch/touch control, rain sensor) or LEDs can be arranged between the glass layers 150 and 350.

Thus, for example, manual control of the electro-optical elements $10_1, 10_2, 10_3, \ldots 10_N$ in the window 1 according to the invention as well as other devices (via the BUS) can be enabled, with the number of lines being minimized.

In another embodiment of the invention, the physical interface 40 is arranged at the edge of the window 1.

Thus, for example, the connection can also be relocated in a frame region such that transparency is retained over a large area.

In yet another embodiment of the invention, the first logical interface 20 provides an AC voltage.

Thus, electro-optical elements of certain technologies, such as liquid crystal, polymer dispersed liquid crystal device, suspended particle device, which require AC voltage, can also be controlled.

According to an alternative embodiment of the invention, the first logical interface 20 provides a DC voltage.

Thus, electro-optical elements of certain technologies, such as electrochromic coating, which require DC voltage, can also be controlled.

Figure 5:
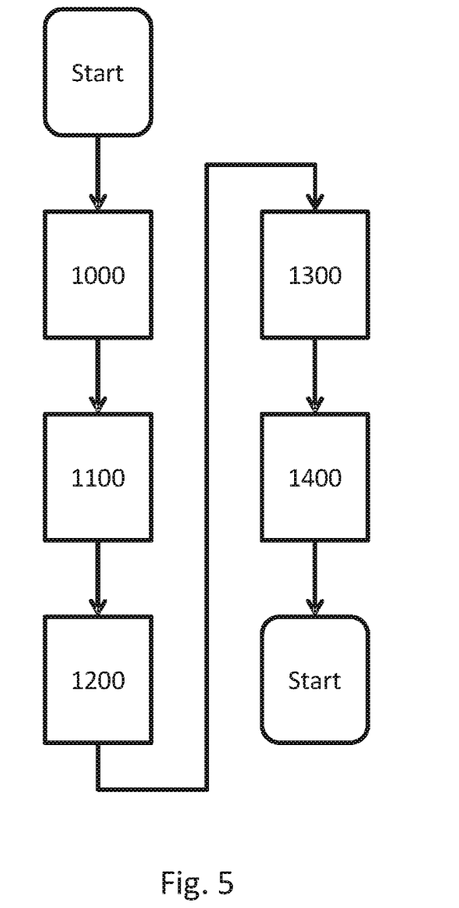

In the following, a production method is additionally provided. The method for producing a window 1 has a step of providing 1000 a first glass layer 150, the step of providing 1100 a plurality of electro-optical elements $10_1, 10_2, 10_3, \ldots 10_N$, the step of providing 1200 electrical connections to the plurality of electro-optical elements $10_1, 10_2, 10_3, \ldots 10_N$, the step of providing 1300 and a second glass layer 350, and the step of bonding 1400 the first glass layer 150 and the second glass layer 350, wherein the plurality of electro-optical elements $10_1, 10_2, 10_3, \ldots 10_N$ and the electrical connections are arranged between the first glass layer 150 and the second glass layer 350.

By means of the invention presented, it is possible to produce a window 1 in which the individual electro-optical elements $10_1, 10_2, 10_3, \ldots 10_N$ can be controlled, wherein the space requirement for the power supply and the control can be kept small. In addition, the arrangement allows simple and reliable wiring and thus ensures a long service life. For example, the window can have capacitive sensors.

In one embodiment of the method, the plurality of electro-optical elements $10_1, 10_2, 10_3, \ldots 10_N$ is formed by separating individual elements.

In other words, the individual electro-optical elements $10_1, 10_2, 10_3, \ldots 10_N$ can be formed both before application on a glass layer 150/350 and after application on a glass layer and, thus, be adapted to different processing chains. The separation can be implemented using suitable cutting tools or by laser machining. Usually, the individual electro-optical elements $10_1, 10_2, 10_3, \ldots 10_N$ are formed from a prefabricated semifinished product, for example, a film sandwich already provided with electrodes. The individual electro-optical elements $10_1, 10_2, 10_3, \ldots 10_N$ can be provided physically as well as being formed by logic-based machining of the electrodes. Providing electro-optical elements $10_1, 10_2, 10_3, \ldots 10_N$ by patterning an electrode can be utilized to minimize the wiring effort.

In another embodiment of the method, the electrical connections of the electro-optical elements $10_1, 10_2, 10_3, \ldots 10_N$ are formed by making contacts at the edge of the individual electro-optical elements $10_1, 10_2, 10_3, \ldots 10_N$.

In other words, by means of contact of electrodes at the edge, the transparency of the window is retained over a large area.

The windows 1 according to the invention can be used both in vehicles of all types, i.e., in land, water, air, and space vehicles, and in buildings, e.g., as external panes, skylights, shower wall glazing, etc.

In particular, the invention enables reducing the number of complications that had to be reckoned with in the prior art during installation of windows and their wiring, since now only a manageable number of connections, for example, 2 or 3 or 4 connections, have to be established, preferably by means of a plug connection. This increased the ease of assembly and also increased contact reliability.

In particular, the invention uses a controller $30$; $30_1 \ldots 30_N$ which substantially gets by with 2 lines of a first logical interface $20$ for the power supply and 2 lines of a second logical interface $21$ for control. By means of a corresponding design of the logical interface, the physical interface $40$ can be reduced to 2, 3, or 4 wires.

The controller $30$; $30_1 \ldots 30_N$ can be implemented with SMD technology. Simply stated, it can be considered as being connected, on the input side, directly to the physical interface $40$, whereby, on the output side, each of the electro-optical elements $10_1, 10_2, 10_3, \ldots 10_N$ is connected via at least one forward line and, depending on the embodiment, one common return line or individual return lines. If the controller $30$ is construed as a sequence of logical control units $30_1 \ldots 30_N$, it can be simply assumed that the logical control units $30_1 \ldots 30_N$ are connected in parallel to the power supply (logical interface $20$), whereas the control signal is made available in series via an internal bus (logical interface $21$). Each of the logical control units $30_1 \ldots 30_N$ can then "evaluate" the control signal and control the associated electro-optical element $10_1, 10_2, 10_3, \ldots 10_N$ accordingly. The logic can be designed digitally (using logic circuits), while, for example, the actual switching of the voltage to the electro-optical elements $10_1, 10_2, 10_3, \ldots 10_N$ can be realized, depending on technology, either by (MOS) FET or bipolar transistor, (solid-state) relay, triac, or the like.

It should be reiterated that individual components of the controller $30$; $30_1 \ldots 30_N$ can be arranged within the window $1$, for example, in or on a bonding layer $210$ or $220$. Exemplary bonding layers $210$ or $220$ can, for example, include polyvinyl butyral (PVB).

In addition, individual components of the controller $30$; $30_1 \ldots 30_N$ can also be integrated into a plug connector $40$ as one embodiment of the physical interface $40$.

The (parts of the) controller $30$; $30_1 \ldots 30_N$, that are arranged on one of the outer faces $100$, $400$ of the window $1$ can, for example, be attached by adhesive bonding/double-sided adhesive tape.

LIST OF REFERENCE CHARACTERS $1$ (glass) window
$10_1 \ldots 10_N$ electro-optical element
$20$ logical interface, power supply
$21$ logical interface, control
$30, 30_1 \ldots 30_N$ controller
$40$ physical interface
$50$ connecting line
$100$ outer surface
$150$ glass layer
$210$ bonding layer
$220$ bonding layer
$350$ glass layer
$400$ outer surface
Steps of the Method $1000$ Providing a first glass layer
$1100$ Providing a plurality of electro-optical elements
$1200$ Providing electrical connections
$1300$ Providing a second glass layer
$1400$ Bonding the first glass layer and the second glass layer

The invention claimed is:

1. A vehicle window comprising:
   a plurality of integrated electro-optical elements, and
   a plurality of logical control units,
   wherein the electro-optical elements have a common supply voltage, wherein the integrated electro-optical elements are controllable individually by the logical control units such that each of the electro-optical elements is addressed individually by one of the logical control units and such that the electro-optical elements change the optical properties of the window at a respective location within the vehicle window, wherein the logical control units are arranged in an intermediate layer of the vehicle window, wherein a first logical interface for feeding in the common supply voltage and a second logical interface for feeding in a common control signal are provided for controlling the electro-optical elements and for providing the common supply voltage, wherein, downstream from the second logical interface, the common control signal is converted into control signals for the control of the integrated electro-optical elements individually, wherein a physical interface implemented as a plug connector is arranged on one of the outer faces of the window, and wherein the physical interface for the first logical interface and the second logical interface has, together, 3 or 4 electrical connections.

2. The vehicle window according to claim 1, wherein the electro-optical elements are provided for controlling the optical transparency of the window.

3. The vehicle window according to claim 1, wherein the electro-optical elements are selected from a group comprising: electrochromic coating, suspended particle device, liquid crystal, and polymer dispersed liquid crystal device.

4. The vehicle window according to claim 1, wherein the physical interface is arranged on a recess of the window.

5. The vehicle window according to claim 1, wherein the second logical interface is a single-wire or two-wire interface.

6. The vehicle window according to claim 1, wherein the second logical interface can be connected to a bus system.

7. The vehicle window according to claim 6, wherein the bus system is a vehicle bus system.

8. The vehicle window according to claim 6, wherein the bus system is a CAN bus.

9. The vehicle window according to claim 1, wherein the second logical interface further electrically connects sensor and/or display elements in the window.

10. The vehicle window according to claim 1, wherein the physical interface is arranged at the edge of the window.

11. The vehicle window according to claim 1, wherein the first logical interface provides an AC voltage.

12. The vehicle window according to claim 1, wherein the first logical interface provides a DC voltage.

* * * * *